United States Patent [19]

Murphy

[11] 4,063,006

[45] Dec. 13, 1977

[54] HIGH POWER BATTERY WITH LIQUID DEPOLARIZER

[75] Inventor: Francis G. Murphy, Tiverton, R.I.

[73] Assignee: The United States of America as represented by the Secretary of the Navy, Washington, D.C.

[21] Appl. No.: 772,418

[22] Filed: Feb. 28, 1977

[51] Int. Cl.² .............................................. H01M 6/34
[52] U.S. Cl. .................................. 429/119; 429/101; 429/218
[58] Field of Search ................. 429/119, 118, 110, 27, 429/34, 72, 81, 101, 113, 118, 163, 218, 105

[56] References Cited

U.S. PATENT DOCUMENTS

| | | | |
|---|---|---|---|
| 1,032,830 | 7/1912 | Hesseln | 429/63 |
| 3,247,024 | 4/1966 | Tamminen | 429/113 X |
| 3,573,103 | 3/1971 | Brown | 429/34 |
| 3,576,679 | 4/1971 | Shipps | 429/27 |

Primary Examiner—Anthony Skapars
Attorney, Agent, or Firm—Richard S. Sciascia; Arthur A. McGill; Prithvi C. Lall

[57] ABSTRACT

Liquid oxychlorides are fed to a cathode chamber in an aqueous electrolyte battery. The oxychlorides flow through a porous carbon electrode. At the electrode the oxychlorides are reduced and the reaction products dissolve in an aqueous electrolyte flowing by the face of the carbon electrode opposite to that in which the oxychlorides are introduced. Metal standoffs connect to the porous electrode for use as conductors while maintaining spacing in the cathode chamber.

6 Claims, 3 Drawing Figures

U.S. Patent   Dec. 13, 1977   4,063,006
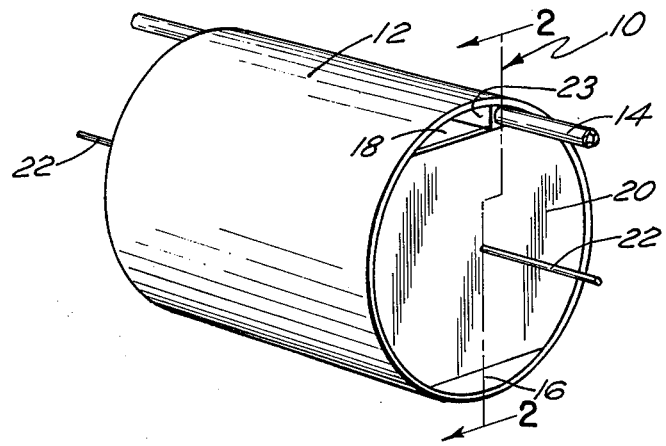
FIG. 1
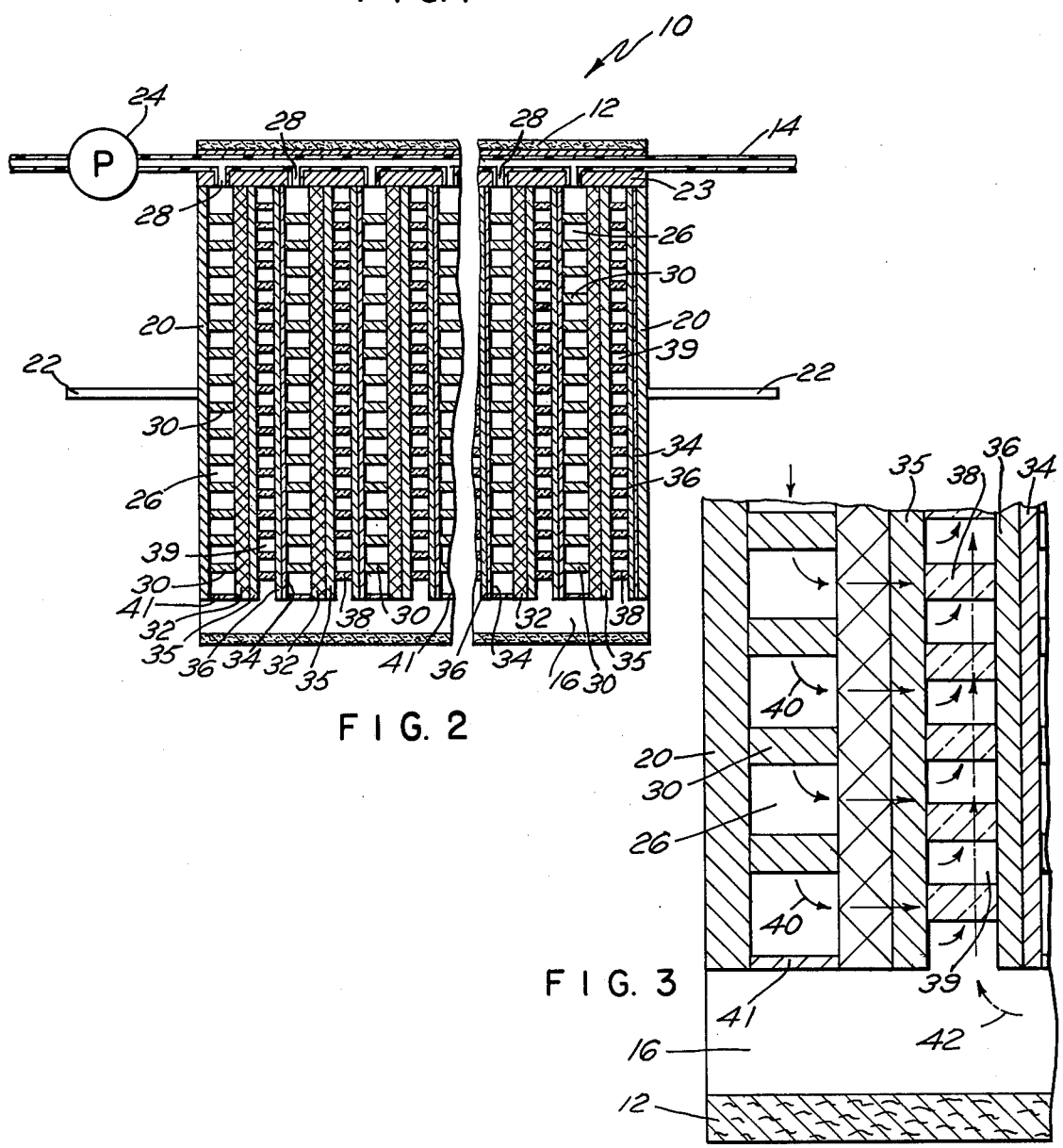
FIG. 2
FIG. 3

HIGH POWER BATTERY WITH LIQUID DEPOLARIZER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to primary batteries and more particularly to a sea water battery having a high energy density. The device is uniquely applicable for use on underwater vehicles.

Development efforts for the last generation have resulted in a sea water battery having a silver chloride or silver oxide cathode and a magnesium or aluminum anode. Improvements to the battery have resulted from improved anodes and enrichment of electrolytes. However, prior to the present invention there has been no improvement for the silver chloride or silver oxide cathode. Battery capacity has been limited by the maximum thickness and density of the solid cathode. As the cathode discharged, performance deteriorated since the electrolyte had to travel through the pores of the reduced silver. In addition, the cost of silver has increased enormously. The anode, on the other hand, could be kept clean by acid in the sea water. This plus major improvements in power density and anode efficiency serve to further emphasize the limitations of the cathode.

SUMMARY OF THE INVENTION

It is therefore a general object of the present invention to provide an improved primary battery. It is an additional object that the battery be suitable for utilizing sea water as an electrolyte. Another object is to improve the operation and reduce the cost of the cathode electrode by eliminating the use of silver oxide and silver chloride as cathode materials. It is a further object to provide an improved cathode reactant. It is a further object of the invention to use the cathode reactant products to acidify the electrolyte. These and other objects of the invention and the various features and details of construction and operation will become apparent from the specification and drawings.

These are accomplished in accordance with the present invention by providing an electrical energy producing battery having a metal anode, aqueous electrolyte, porous carbon cathode and a liquid cathode reactant that is forced through the porous cathode. A controllable current density battery is provided in which the electrolyte washes away reactant wastes at the cathode, allowing the maintenance of high current density over an extended operating period. The cathode reactant remains invariant with time and power density.

BRIEF DESCRIPTION OF THE DRAWINGS

FIG. 1 is a perspective view of the invention;
FIG. 2 is a sectional view along the lines 2—2 of FIG. 1; and
FIG. 3 is an enlarged view of a portion of FIG. 2.

DESCRIPTION OF THE PREFERRED EMBODIMENT

Referring to FIG. 1 there is generally shown a battery section 10 having a shell 12 enclosing various components. Feed pipe 14, bound by an epoxy compound 23, is used for transporting oxychlorides that function as liquid cathode reactants. A flow passage 16 delivers an aqueous solution such as sea water to battery section 10. A second passage 18 provides for removal of sea water and oxychloride reaction products in a manner to be described later. A bus plate 20 is included at both ends of battery section 10 and supports a bus bar 22.

FIG. 2 shows a sectional view of FIG. 1 along lines 2—2. The battery section 10 is shown containing a pump 24 supplying oxychlorides to chambers 26 through the feed pipe 14 having apertures 28 opening into cathode chambers 26. The chambers 26 have metal standoffs 30 to maintain spacing in cathode chambers 26 and to carry current between a porous carbon electrode 32 that functions as a cathode in the system and metal foils 34 or bus plate 20. A metal screen 35 abuts and is part of carbon electrodes 32. The system includes anodes 36 that are made of solid metal. Materials suitable for use include magnesium, berryllium, aluminum and other suitable metals. The anodes 36 and cathodes 32 have insulating electrode spacers 38 between made of glass beads or plastic for providing chambers 39. The chambers 39 receive sea water from flow passage 16 and electrode reaction products. An epoxy buffer 41 encloses chamber 26.

The operation of the device is best described with reference to FIG. 3. Liquid oxychlorides, principally sulfuryl chloride or other liquid cathode reactors serve as the liquid reactants 40. The cathode chamber 26 feeds the reactants 40 to the cathode 32. The reactants 40 flow through the inert carbon electrode 32. Within the pores of the carbon structure 32, the reactants 40 are simultaneously reduced and hydolyzed. The reaction products formed are dissolved in the aqueous electrolyte 42 that flows into chamber 39 via flow passage 16. Both reactants 40 and electrolyte 42 are ejected out of passage 18 of FIG. 1.

There has therefore been described a primary sea water battery 10 that eliminates the need for silver, provides an invariant cathode 32 with capacity limited only by the reservoir external to the battery 10. Energy density of of the cathode 32 is increased since the oxychlorides 40 will increase cell voltage by approximately one volt and the amp hour capacity is increased approximately four times for the same weight.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:
1. A sea water battery comprising:
a solid anode;
a porous flow through cathode;
an entrance chamber adjacent to one side of said cathode;
an electrolyte chamber adjacent to the other side of said cathode and one side of said anode;
first means adapted for supplying reactant through said entrance chamber and said porous flow through cathode to said electrolyte chamber;
second means adapted for supplying an aqueous electrolyte to said electrolyte chamber; and
third means adapted for removing spent reaction products from said chamber.

2. A sea water battery according to claim 1 wherein said porous flow through cathode comprises carbon material.

3. A sea water battery according to claim 2 wherein said anode comprises magnesium material.

4. A sea water battery according to claim 2 wherein said anode comprises berryllium material.

5. A sea water battery according to claim 2 wherein said anode comprises aluminum material.

6. A sea water battery according to claim 1 wherein said cathode comprises a mesh screen.

* * * * *